US009100230B2

(12) United States Patent
Yamagata

(10) Patent No.: US 9,100,230 B2
(45) Date of Patent: Aug. 4, 2015

(54) EFFICIENT CALCULATION OF INITIAL EQUALISER COEFFICIENTS

(71) Applicant: IMAGINATION TECHNOLOGIES, LTD., Kings Langley (GB)

(72) Inventor: Taku Yamagata, Chepstow (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 14/170,010

(22) Filed: Jan. 31, 2014

(65) Prior Publication Data

US 2014/0294058 A1    Oct. 2, 2014

(30) Foreign Application Priority Data

Mar. 27, 2013  (GB) .................................. 1305592.6

(51) Int. Cl.
*H03H 7/30* (2006.01)
*H04L 25/03* (2006.01)
*H04L 25/02* (2006.01)

(52) U.S. Cl.
CPC ....... *H04L 25/03159* (2013.01); *H04L 25/0212* (2013.01); *H04L 2025/03611* (2013.01); *H04L 2025/03656* (2013.01)

(58) Field of Classification Search
CPC ................. H04L 25/03057; H04L 2025/0349; H04L 2025/03617; H04L 25/03038; H04L 25/03146; H04L 1/0054; H04L 2025/03496; H04L 2025/03503; H04L 25/03159
USPC ........................... 375/233, 232, 229, 231, 230
See application file for complete search history.

(56) References Cited

U.S. PATENT DOCUMENTS

| 2002/0131490 A1* | 9/2002 | Allpress et al. ................ 375/233 |
| 2004/0179483 A1* | 9/2004 | Perlow et al. ................. 370/278 |
| 2005/0053129 A1* | 3/2005 | Yousef ........................... 375/233 |
| 2005/0180558 A1* | 8/2005 | Zhang ......................... 379/406.1 |
| 2007/0064824 A1* | 3/2007 | Wang et al. .................... 375/260 |
| 2009/0220035 A1  | 9/2009 | Park et al. |
| 2010/0080278 A1  | 4/2010 | Chang et al. |
| 2012/0099635 A1* | 4/2012 | Yoshimochi et al. ......... 375/229 |
| 2014/0029661 A1* | 1/2014 | Takaoka et al. ............... 375/232 |

OTHER PUBLICATIONS

IEEE Transactions on Broadcasting, vol. 50, No. 1, Mar. 2004, pp. 32-41, Wu Y. et al, An ATSC DTV receiver with improved robustness to multipath and distributed Transmission.
Combined Search and Examination Report, dated Sep. 23, 2013, as cited in GB Application 1305592.6 (4pgs).

* cited by examiner

*Primary Examiner* — Kenneth Lam
(74) *Attorney, Agent, or Firm* — Vorys, Sater, Seymour and Pease LLP; Vincent M DeLuca

(57) ABSTRACT

Methods of efficient calculation of initial equalizer coefficients are described. In a first stage, a channel matched filter is generated based on an estimate of CIR and then used to filter the CIR estimate. In a second stage, initial FFE coefficients are calculated from a portion of the match filtered CIR and then these initial FFE coefficients and the estimate of CIR may be used to generate initial DFE coefficients. In various embodiments, a window is applied to the CIR estimate before the matched filter is generated. In various embodiments, the second stage is iterated to minimize the pre-echoes following the FFE.

18 Claims, 11 Drawing Sheets

EFFICIENT CALCULATION OF INITIAL EQUALISER COEFFICIENTS

BACKGROUND

Digital terrestrial television signals suffer from multi-path interference which leads to pre-echoes which are caused by signals received via paths which are shorter than the path travelled by the principal signal and post-echoes which are caused by signals that have travelled along longer paths. A digital television receiver therefore comprises circuitry, including an adaptive equaliser, to suppress the echoes.

A common method of equalisation of such signals is to use a combination of a feed-forward equaliser (FFE) and a decision-feedback equaliser (DFE). These two different types of equaliser have different characteristics and can be used to deal with different aspects of the interference. The FFE can deal with both precursor and postcursor intersymbol interference (ISI), e.g. both pre-echoes and post-echoes, whilst the DFE can only deal with postcursor ISI but, unlike the FFE, does not enhance noise.

In order to use this combination of a FFE and DFE, it is necessary to specify equaliser coefficients and whilst these can be adapted to refine the equaliser and/or adapt to changes in the channel, initial coefficients need to be specified. One example method of obtaining equaliser coefficients is using the Wiener-Hopf equation, however, the large number of delay taps which are used makes solving this equation very complex and in some cases it may, in practise, be too complex to solve.

The embodiments described below are not limited to implementations which solve any or all of the disadvantages of known methods of calculating equaliser coefficients.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods of efficient calculation of initial equaliser coefficients are described. In a first stage, a channel matched filter is generated based on an estimate of CIR and then used to filter the CIR estimate. In a second stage, initial FFE coefficients are calculated from a portion of the match filtered CIR and then these initial FFE coefficients and the estimate of CIR may be used to generate initial DFE coefficients. In various embodiments, a window is applied to the CIR estimate before the matched filter is generated. In various embodiments, the second stage is iterated to minimise the pre-echoes following the FFE.

A first aspect provides a method of generating initial coefficients for use in an equaliser in a wireless receiver comprising: generating a channel matched filter using an estimate of channel impulse response; filtering the estimate of channel impulse response using the channel matched filter; splitting the filtered estimate of channel impulse response into a first portion and a second portion, the first portion comprising all pre-echoes; calculating initial FFE coefficients using an inverted version of the first portion in a frequency domain.

A second aspect provides an equaliser for use in a wireless receiver, the equaliser comprising hardware logic arranged to generate initial coefficients for the equaliser and the hardware logic comprising: a matched filter generator arranged to generate channel matched filter using an estimate of channel impulse response; hardware logic arranged to filter the estimate of channel impulse response using the channel matched filter; and hardware logic arranged to split the filtered estimate of channel impulse response into a first portion and a second portion, the first portion comprising all pre-echoes, and calculate initial FFE coefficients using an inverted version of the first portion in a frequency domain.

A third aspect provides a digital television receiver comprising an equaliser as described herein.

A fourth aspect provides a computer readable storage medium having encoded thereon computer readable program code for generating a processor comprising the equalizer as described herein.

A fifth aspect provides a computer readable storage medium having encoded thereon computer readable program code for generating a processor configured to perform the method described herein.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
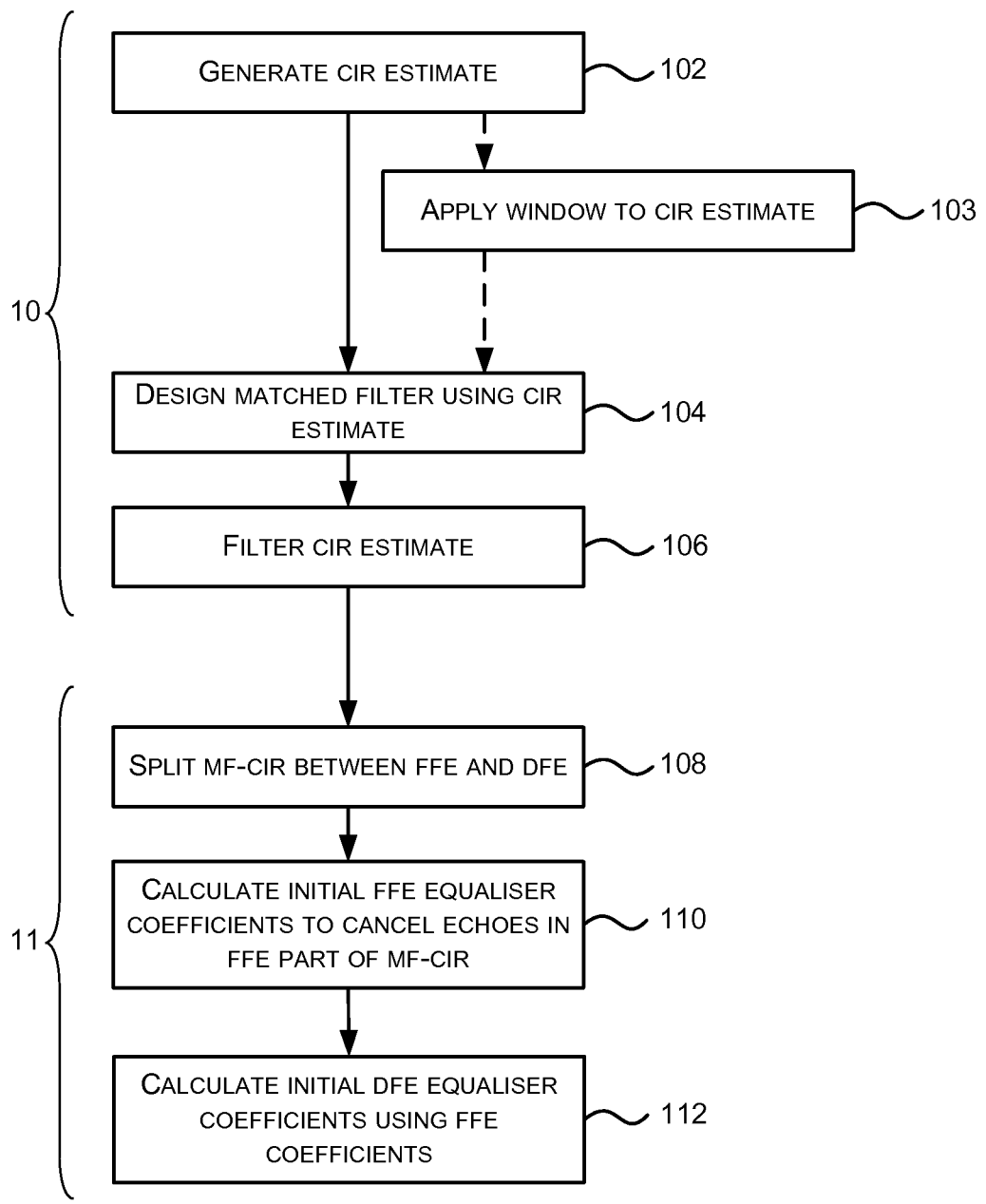
FIG. 1 is a flow diagram of an example method of calculating initial equaliser coefficients.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above, using the Wiener-Hopf equation to calculate equaliser coefficients in the case of a concatenated FFE and DFE can, in practise, be too complex. An alternative method is described below which requires significantly less processing effort. This method which is shown in FIG. 1, comprises two stages 10, 11: firstly a channel matched filter (which may also be referred to as a 'matched filter') is designed and applied to the initial channel estimate (which may be obtained using conventional methods). Applying the channel matched filter enhances the main path energy and removes carrier phase offset and sample timing offset. Secondly, FFE and DFE coefficients are calculated from the match filtered channel estimation generated in the first stage 10. As described in more detail below, the matched filter is designed and applied in the complex domain (which may also be referred to as the fractional spaced domain) and then after the matched filter is applied, the data is converted into the real only domain (which may also be referred to as the symbol spaced domain), which allows use of a less complex algorithm to derive FFE and DFE coefficients without losing any information within the initial channel estimation.

Figure 2:
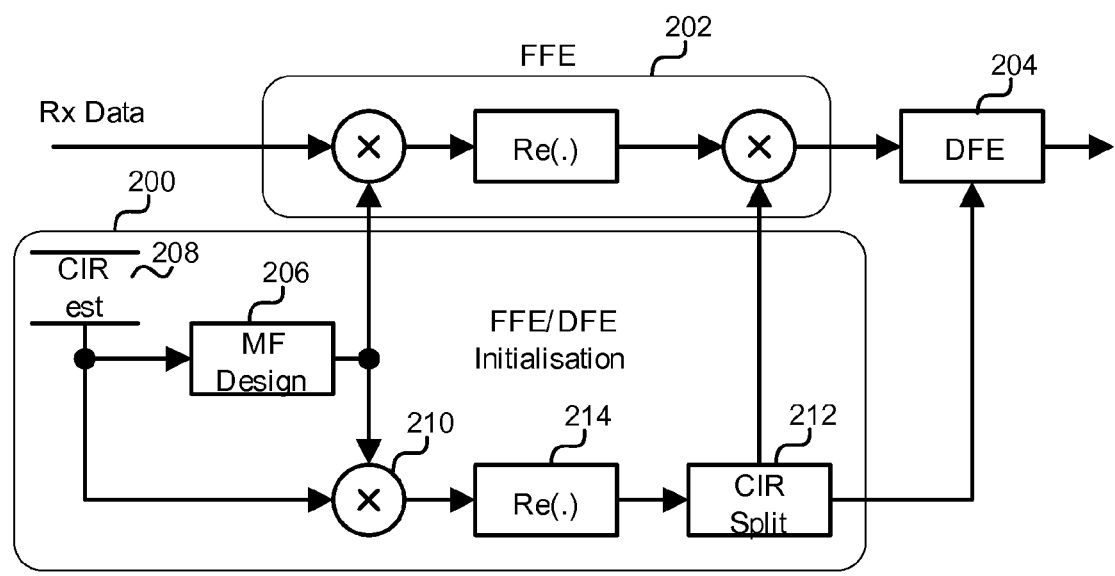
FIG. 2 is a block diagram showing an example method of generating initial equaliser coefficients.

FIG. 2 is a block diagram showing an example method of generating initial equaliser coefficients and this can be described with reference to the flow diagram in FIG. 1. The initial equaliser coefficients are generated in the FFE/DFE initialisation block 200 and are fed into both the FFE 202 and DFE 204. As described above, in the first stage 10, an initial channel estimation or estimated channel impulse response (CIR) 208 is generated (in block 102). This initial channel estimation may be generated using any method, for example using known techniques and a pilot sequence. A matched filter (MF) is then generated using the estimated CIR 208 (blocks 104 and 206) and methods of generating the matched filter are described below. The matched filter (generated in blocks 104 and 206) is then applied to the estimated CIR 208 (in block 106, e.g. using multiplier 210) to produce the match filtered CIR.

In the second stage 11, the match filtered CIR (MF-CIR) is split into a first portion and a second portion (in blocks 108 and 212) and the first portion of the MF-CIR is used to generate initial FFE coefficients (in block 110) which are fed into the FFE 202. These initial FFE coefficients and the second portion of the MF-CIR are then used (in block 112) to generate the initial DFE coefficients which are fed into the DFE 204. The calculation of the initial FFE and DFE coefficients is performed within the 'CIR Split' block 212 in FIG. 2.

As shown in FIG. 2, the FFE coefficient generation (in blocks 110 and 212) uses the real-part of the match filtered CIR (as extracted in block 214 from the match filtered CIR output from multiplier 210). Although the extraction of the real-part of the MF-CIR is shown as a separate functional block in FIG. 2, it may be integrated within the CIR split/FFE coefficient calculation process, as described in more detail below.

The channel matched filter may be generated (in blocks 104 and 206) in either the time or frequency domain. In the time domain, the matched filter may be generated by taking the complex conjugate of the time reversed channel impulse response (i.e. the complex conjugate of the time reversed CIR estimate 208). In the frequency domain, the matched filter may be generated (in blocks 104 and 206) by taking the complex conjugate of the channel frequency response.

The channel matched filter (generated in blocks 104 and 206) may introduce additional channel impulse responses which may fall outside the equaliser range, i.e. they would require tap lengths which exceed the maximum available (or desired) length within the equaliser. Consequently, in some examples, a window may be applied to the estimated CIR 208 (in block 103) before it is used to generate the channel matched filter (in blocks 104 and 206). The window, which is applied in the time domain, can be explained with reference to FIG. 3.

Figure 3:
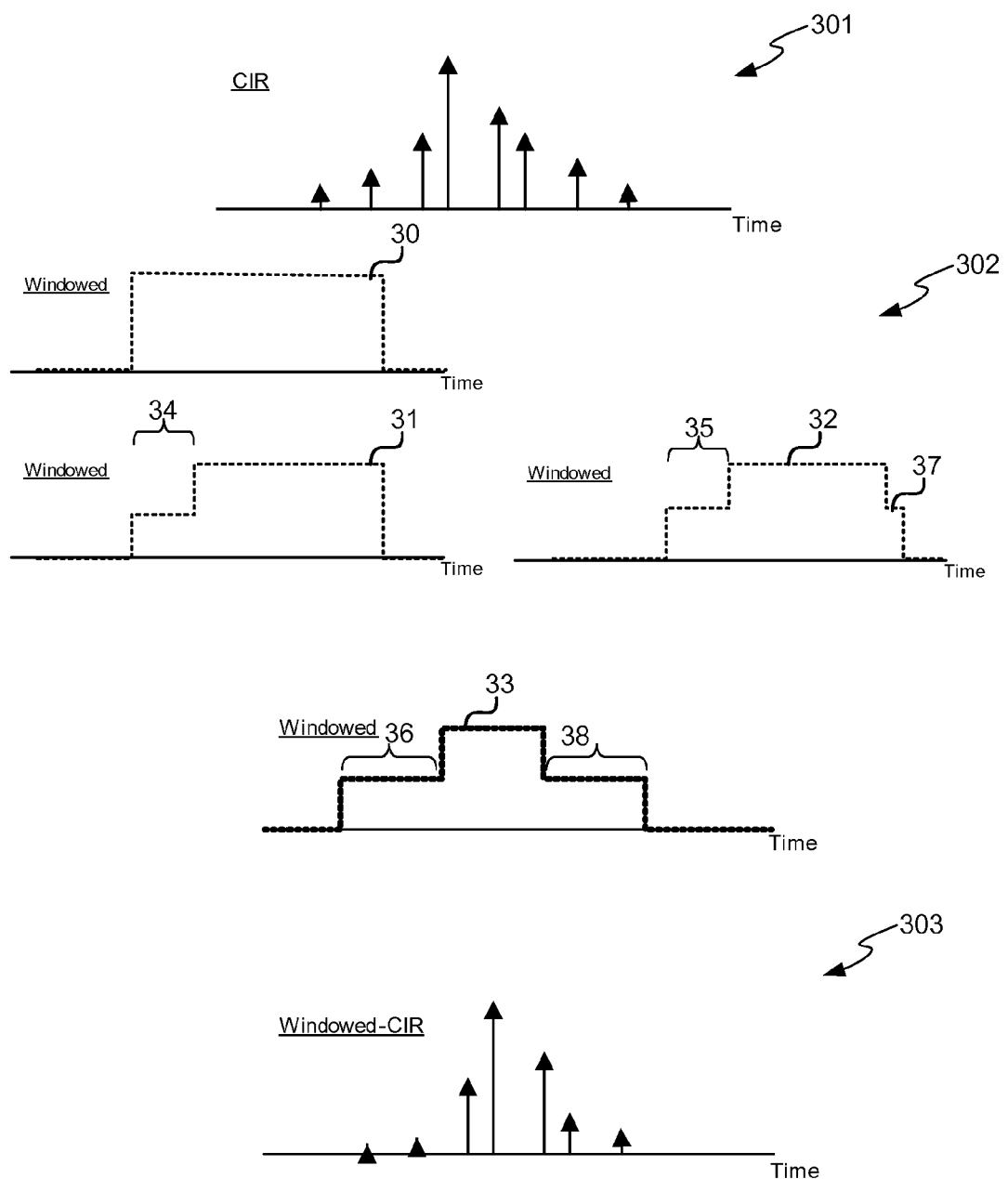
FIG. 3 shows schematic diagrams of windows which may be used in generating a channel matched filter.

The first diagram 301 in FIG. 3 shows a representation of an example CIR in the time domain. The second diagram 302 in FIG. 3 shows four example window shapes 30-33. Each of these windows has a different shape or profile. The first example window 30 has a constant amplitude, while in the other three examples 31-33 the leading part of the window (indicated by brackets 34-36) has a reduced amplitude compared to a centre part of the window. In the examples shown, the leading parts 34-36 of the windows 31-33 are reduced in amplitude by around 50%, however in other examples the amplitude may be reduced by a larger or smaller amount (e.g. 75% or 25%). In the second example window 31, the part of the window following the leading part 34 has a constant (100%) amplitude; however in the third and fourth examples, there is a trailing part 37-38 of the window which also has a reduced amplitude. The amplitude of the trailing part 37-38 may be the same as the amplitude of the leading part or may be different. Similarly, the length of the trailing part may be the same as the leading part (as in window 33) or a different length (as in window 32). In an example which has a profile similar to window 33, a window may extract +/−250 symbol duration CIRs from the main path, with all amplitude within +/−50 symbol duration (the centre part of the window) and half of the CIR amplitude outside this range (i.e. in the leading and trailing parts of the window). The exact design of window which is used may depend on the particular equaliser design, for example, on the number of taps in the equaliser.

The windows 31-33 when applied to the CIR 301 extract a portion of the CIR, which is referred to herein as the windowed CIR and the windowed CIR is shown in the third diagram 303. In this example, the windowed CIR corresponds to window 33. As described above, the use of a window to extract a portion of the CIR prior to the generation of the matched filter reduces the possibility of echoes which cannot be cancelled with the available tap lengths.

Figure 4:
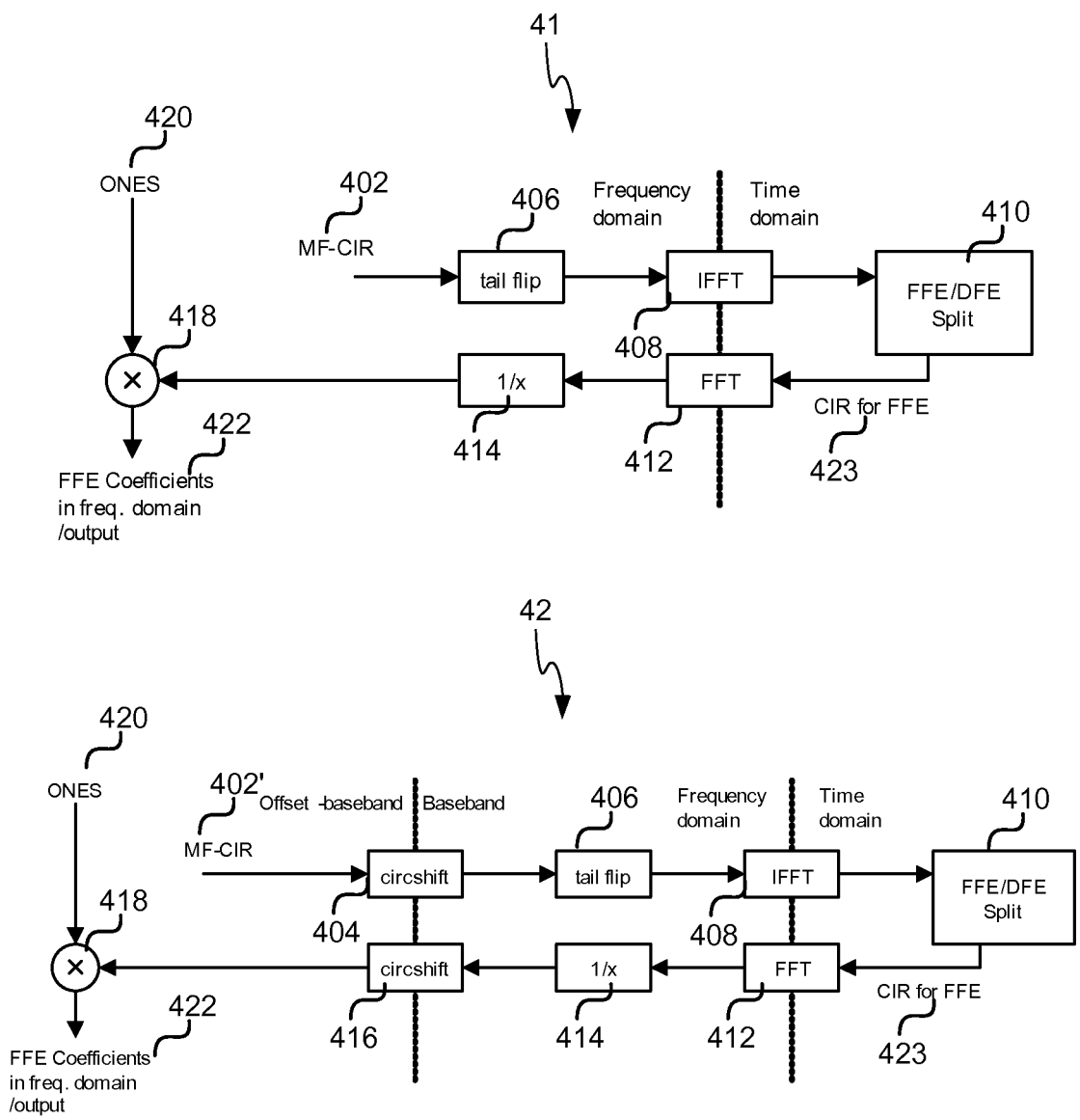
FIG. 4 shows two example implementations of the first part of the second stage of the method shown in FIG. 1.

FIG. 4 shows two example implementations of the first part of the second stage 11 of the method shown in FIG. 1 (blocks 108-110). These implementations combine the two functional blocks 212 and 214 shown in FIG. 2. This stage has two inputs: the channel matched filtered CIR estimation 402 or 402' (as output from multiplier 210 in FIG. 2), where this MF-CIR 402, 402' may have been generated from the initial CIR estimate 208 with or without applying a window to the CIR estimate (in block 103), and a string of ones which are referred to herein as 'dummy FFE coefficients'.

In the first example 41, the real part of the MF-CIR 402 is extracted (in block 406), whilst still operating in the frequency domain. An inverse fast Fourier transform (IFFT) is then used (in block 408) to convert from the frequency domain to the time domain before the MF-CIR is split into two parts (in block 410): the CIR for FFE 423 which is used and a second part which is discarded. Various methods for performing the split, which may alternatively be described as the extraction or selection of the CIR for FFE 423, (in block 410) are described below and in these examples, all the pre-echoes are included in the first (FFE) portion 423 and most or all of the post-echoes are included in the second, discarded portion. In some examples, part of the short post-echoes may be included in the FFE portion 423 instead of being discarded.

The first (FFE) portion of the CIR 423 (as output by block 410) is then used to calculate the initial FFE coefficients by converting back to the frequency domain using a FFT (block 412), inverting the signal (block 414). The signal is then combined (in multiplier 418) with the input dummy FFE coefficients (which are set to be all ones) 420 to output the initial FFE coefficients in the frequency domain 422.

In the second example 42, the MF-CIR 402' is not baseband and is consequently shifted to baseband (in block 404) before the real part is extracted (in block 406) and then, following the split and inversion (in blocks 410-414), the signal is shifted back to its offset-baseband position (in block 416). It will be appreciated that in other implementations the signal may be shifted to a position other than baseband.

Figure 5:
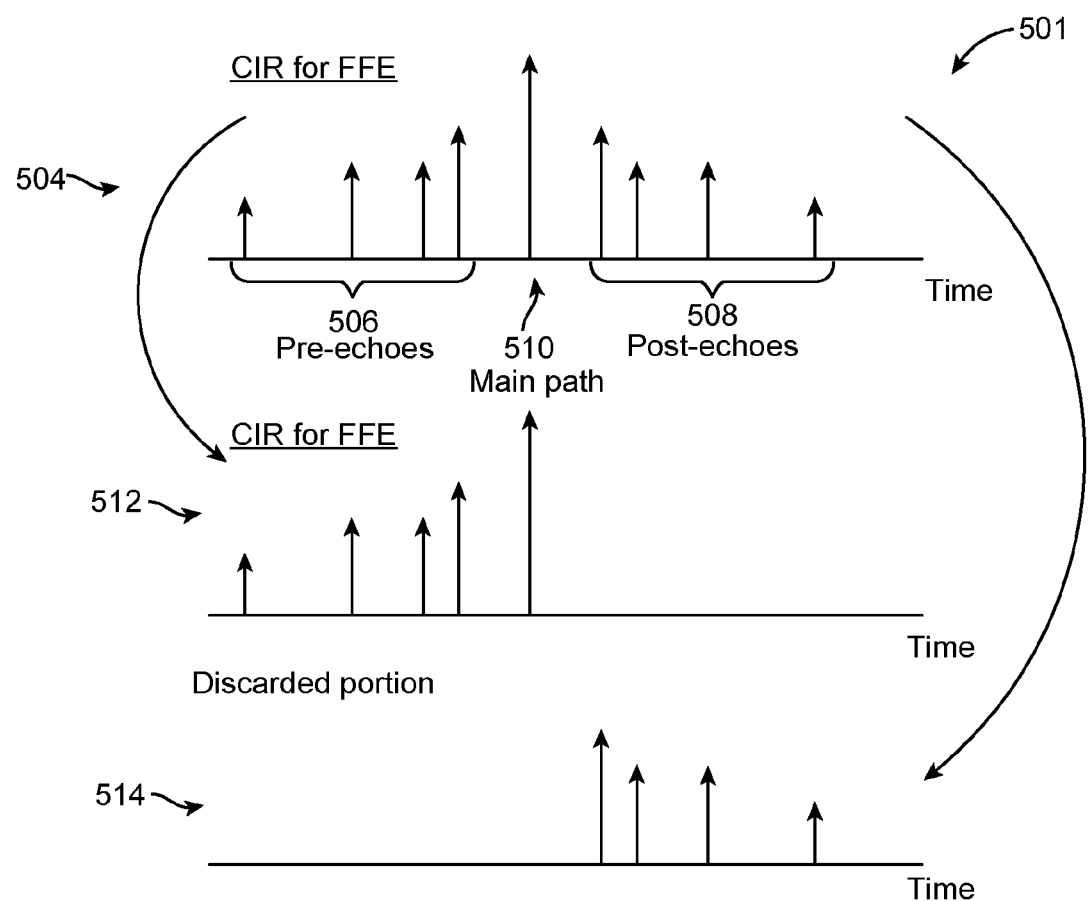
FIG. 5 shows two example implementations of one of the steps in the first part of the second stage of the method shown in FIG. 1.
Figure 5:
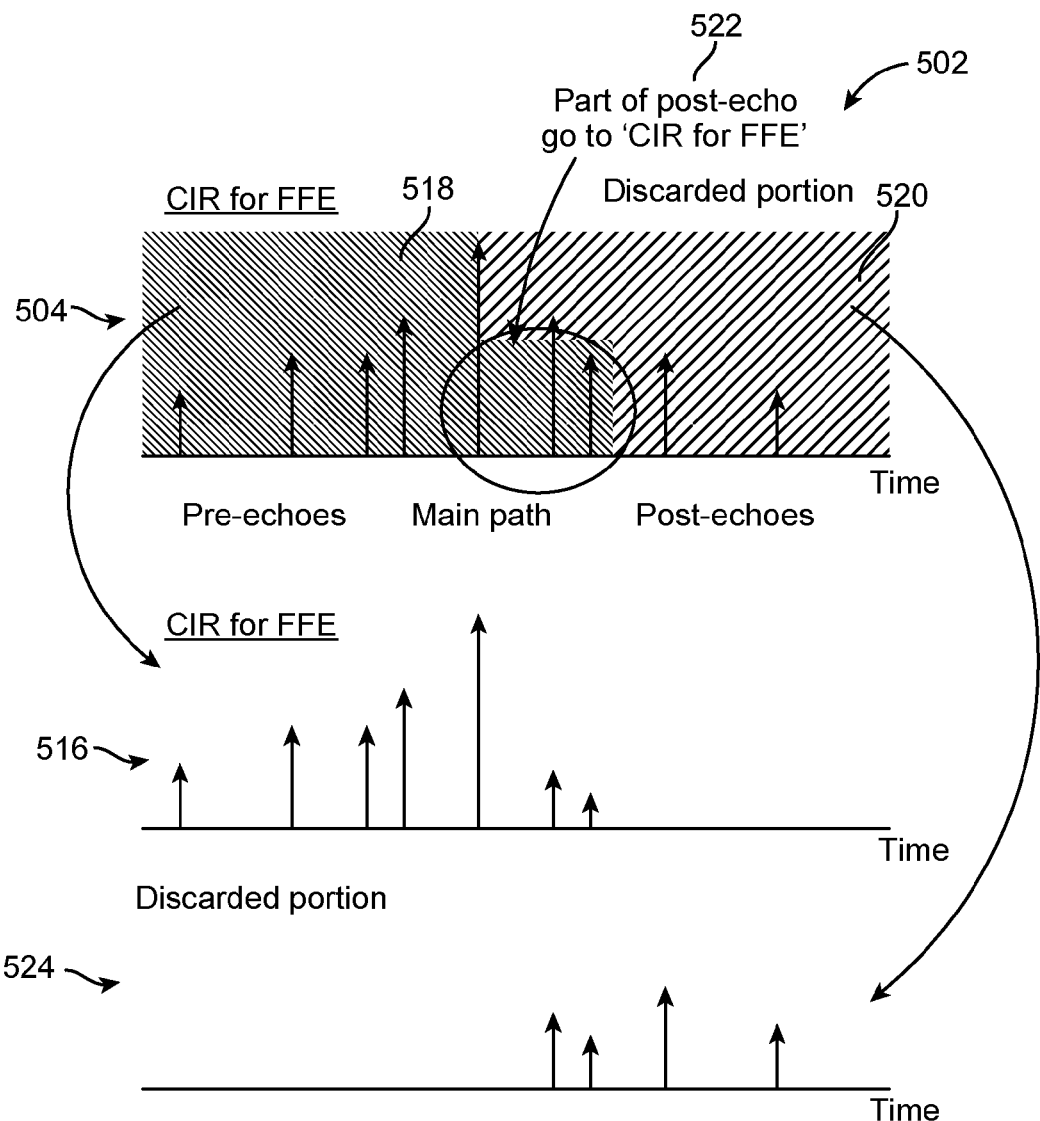

The splitting of the real part of the MF-CIR in block 410 can be described with reference to FIG. 5. FIG. 5 shows two schematic diagrams 501, 502 of the MF-CIR split, each showing a different example implementation. In both examples, the MF-CIR 504 (shown in the time domain) is the same and comprises a number of pre-echoes 506 and post-echoes 508 either side of the main path 510. In the first example 501, there is a clear split with the main path 510 and pre-echoes 506 forming the CIR for FFE 512 (or "first (FFE) portion") and the post-echoes 508 forming the second portion 514 which is discarded. In the second example 502, however, the split does not occur at a distinct point in time (as it did in the first example 501), but instead a part of some of the short post-echoes (i.e. those post-echoes which are closest to the main path 510) are included in the CIR for FFE 516 instead of the second, discarded portion 524. The shading 518, 520 shows the parts of the MF-CIR 504 which are allocated to the CIR for FFE (shading 518) and second, discarded portion (shading 520) and the parts of the short post-echoes which are assigned to the CIR for FFE 516 in this example are ringed 522. The division of these short post-echoes can be clearly seen in the lower diagrams of the CIR for FFE 516 and second portion 524. In comparing the two examples 501, 502, the second portion 524 in the second example 502 has a reduced amplitude for the particular short post-echoes and the CIR for FFE 516 in the second example 502 includes some short post-echoes, at a reduced amplitude compared to the MF-CIR 504.

In the example shown in FIG. 5, the short post-echoes are divided between CIR for FFE 516 and the discarded portion 524 at an amplitude which is approximately 50% of the amplitude of the main path 510. It will be appreciated that in other examples, the division may occur at a different amplitude and/or a different number of post-echoes may be divided between the two CIR parts. In some examples, all the post-echoes may be split between the CIR for FFE and the second, discarded portion.

By splitting the stronger, short post-echoes between the CIR for FFE and the second, discarded portion, as shown in the second example 502 in FIG. 5, the equalisation that is achieved by the combination of FFE and DFE is improved. In some instances, the decision device in the DFE does not make the correct decision which leads to feedback of the wrong decision and hence error propagation within the DFE. The FFE, in contrast, does not have a similar mechanism for error propagation and so by handling the stronger short post-echoes within the FFE (or part of these stronger post-echoes), the overall equalisation error is reduced, whilst still keeping noise at an acceptable level.

Figure 6:
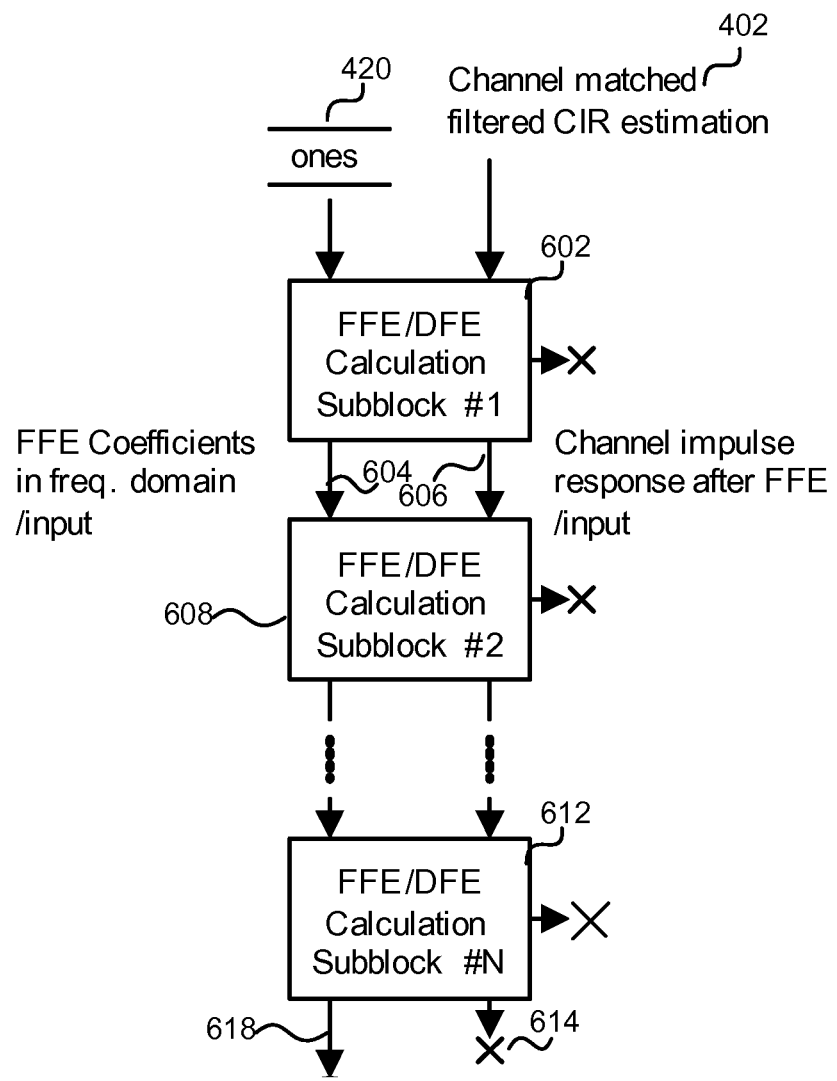
FIG. 6 shows a further example implementation of the first part of the second stage of the method shown in FIG. 1.

FIG. 6 shows a further example implementation of the first part of the second stage 11 of the method shown in FIG. 1 (blocks 108-110). This implementation combines the two functional blocks 212 and 214 shown in FIG. 2 and is similar to that described above with reference to FIG. 4; however, the method shown in FIG. 6 uses an iterative method to calculate the initial FFE coefficients. The iterative method (which is described in more detail below) takes the FFE coefficients output from the method of FIG. 4, and calculates the CIR after FFE (i.e. the remaining CIR after cancellation using the calculated FFE coefficients). The process is then repeated, refining the initial FFE coefficients in each iteration, until there is no significant pre-echo remaining after FFE.

The method shown in FIG. 6 (as in the example of FIG. 4) has two inputs: the channel matched filtered CIR estimation 402 (as output from multiplier 210 in FIG. 2), where this MF-CIR 402 may have been generated from the initial CIR estimate 208 with or without first applying a window (in block 103), and a string of ones 420 as dummy FFE coefficients. These inputs are fed into the first FFE/DFE calculation subblock 602 which outputs FFE coefficients in the frequency domain 604 and the CIR after FFE 606. The CIR after FFE 606 comprises a combination of the uncancelled part of the CIR (i.e. the second portion as described above, as this is not affected by the operation of the subblock), and the cancelled CIR for FFE. The operation of the subblock may result in the generation of some small new pre-echoes and it is these new pre-echoes which are then cancelled in a subsequent subblock.

The outputs from the first FFE/DFE calculation subblock 602 are fed as inputs into the next FFE/DFE calculation subblock 608 and the method iterates through any number, N, of subblocks. As described above, the method may be iterated, using the subblocks, until there is no significant pre-echo remaining after FFE, i.e. such that the CIR after FFE output from a subblock contains no significant pre-echoes. Alternatively, the method may be stopped earlier (e.g. after a predefined number of iterations).

Figure 7:
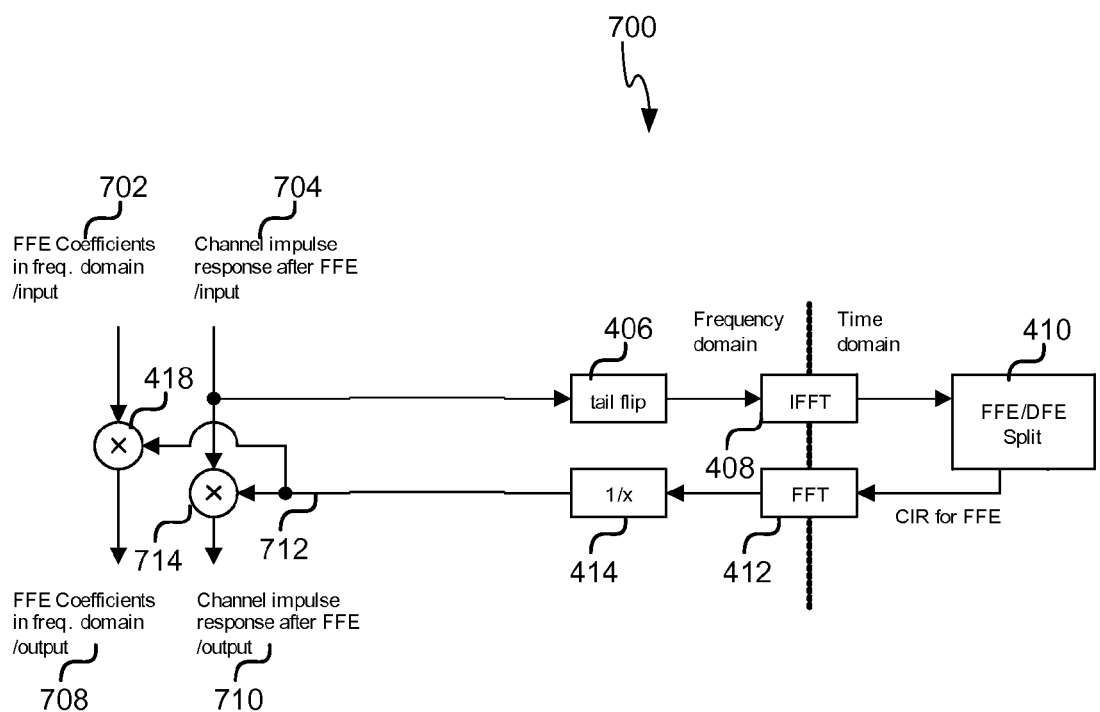
FIG. 7 shows two example implementations of a subblock from FIG. 6.
Figure 7:
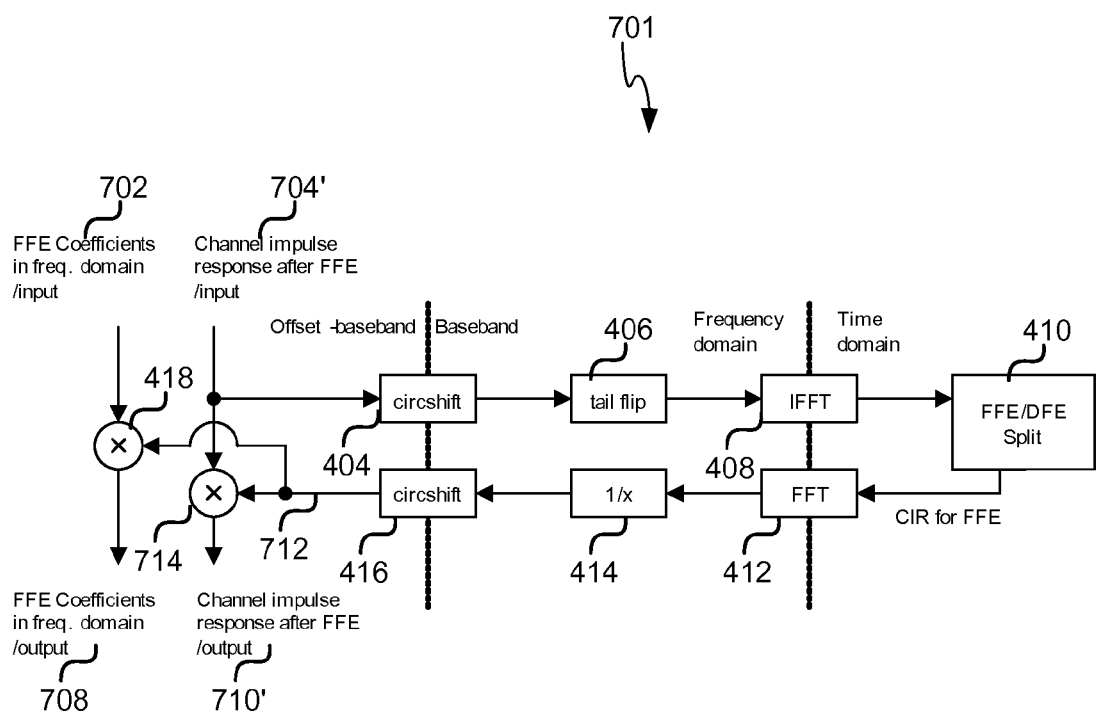

FIG. 7 shows schematic diagrams of two example FFE/DFE calculation subblocks 700, 701. As each subblock in FIG. 6 operates in the same way, it will be appreciated that the system may comprise logic to implement a single subblock with signals being passed multiple times through that logic or the system may comprise logic to implement more than one instance of a subblock with signals being passed through each subblock one or more times. It can be seen that the FFE/DFE calculation subblock 700, 701 operates in the same way as was described above with reference to FIG. 4 and as in FIG. 4, in the first example 700 the input CIR 704 is at baseband and in the second example the input CIR 704' is offset from baseband. The subblock 700, 701 as shown has two inputs, the FFE coefficients in the frequency domain 702 and the CIR after FFE 704, 704' and two outputs: the FFE coefficients in the frequency domain 708 and the CIR after FFE 710, 710' (where again in the first example this is at baseband and in the second example this is offset from baseband. These outputs then form the inputs (the FFE coefficients in the frequency domain 702 and the CIR after FFE 704, 704') for a next FFE/DFE calculation subblock.

In the first iteration (i.e. for the first subblock 602), the first input (the FFE coefficients in the frequency domain 702) corresponds to a string of ones 420 (the dummy FFE coefficients) and the second input (the CIR after FFE 704, 704') corresponds to the MF-CIR 402, 402' and so the inputs are the same as those in the examples of FIG. 4 described above. As in FIG. 4, the FFE coefficients in the frequency domain 708, which are output by the subblock, are formed by combining the inverted version of the CIR for FFE (in the frequency domain) 712 with the string of ones 420 (in multiplier 418). The other output, the CIR after FFE 710, 710', is generated by combining the inverted version of the CIR for FFE 712 with the MF-CIR 402, 402' (in multiplier 714).

In subsequent iterations the input FFE coefficients in the frequency domain 702 are the output FFE coefficients in the frequency domain 708 from the previous iteration (e.g. from the previous subblock) and the input CIR after FFE 704, 704' is the output CIR after FFE 710, 710' from the previous iteration.

In the last (or final) iteration (i.e. for the Nth subblock 612), the CIR after FFE 710,710' is not output (as indicated by the X 614 in FIG. 6). The FFE coefficients 618, 708 may then be passed to the FFE 202 (as shown in FIG. 2) as the initial FFE coefficients.

Figure 8:
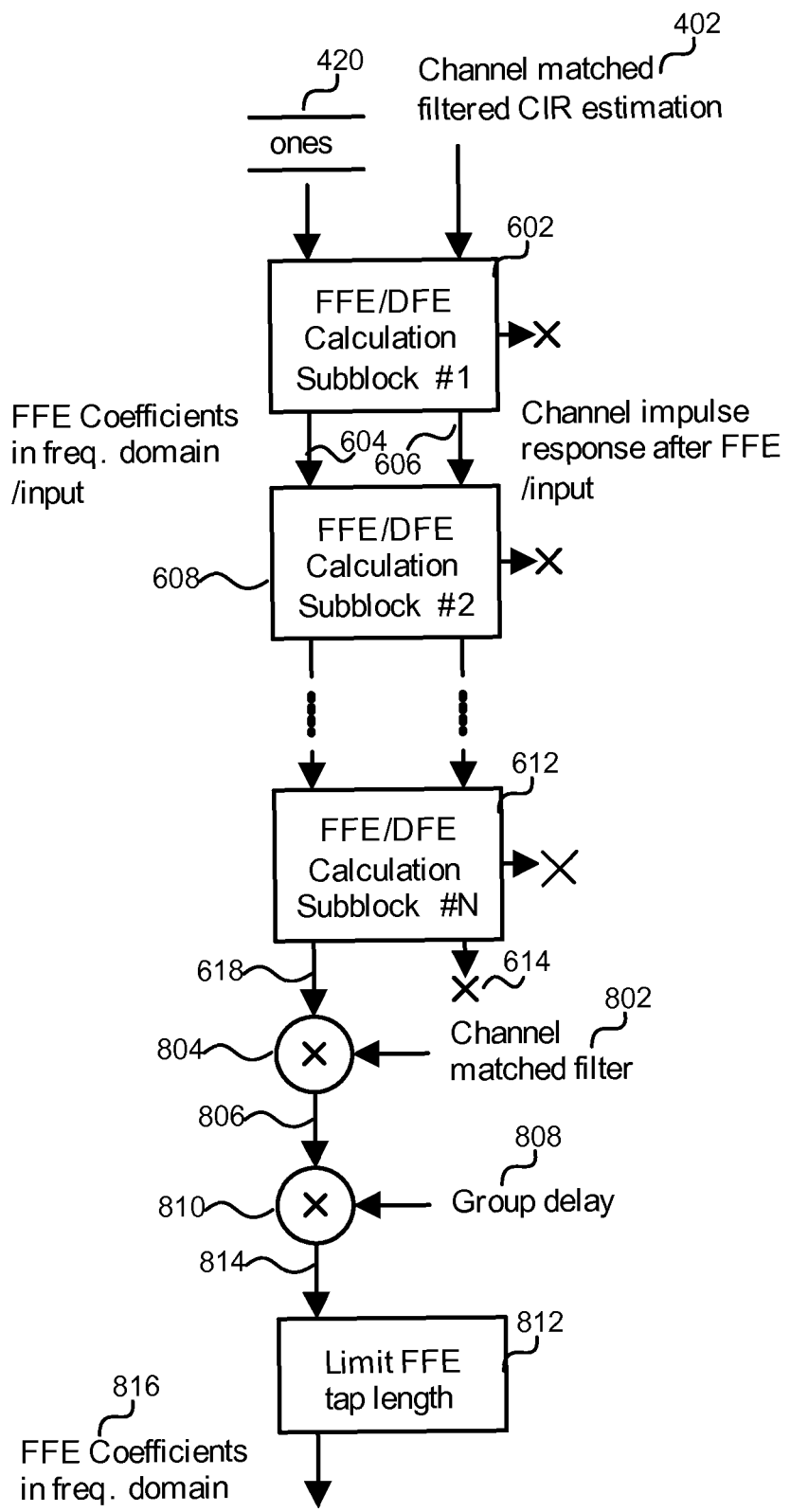
FIG. 8 shows another example implementation of the first part of the second stage of the method shown in FIG. 1.
Figure 9:
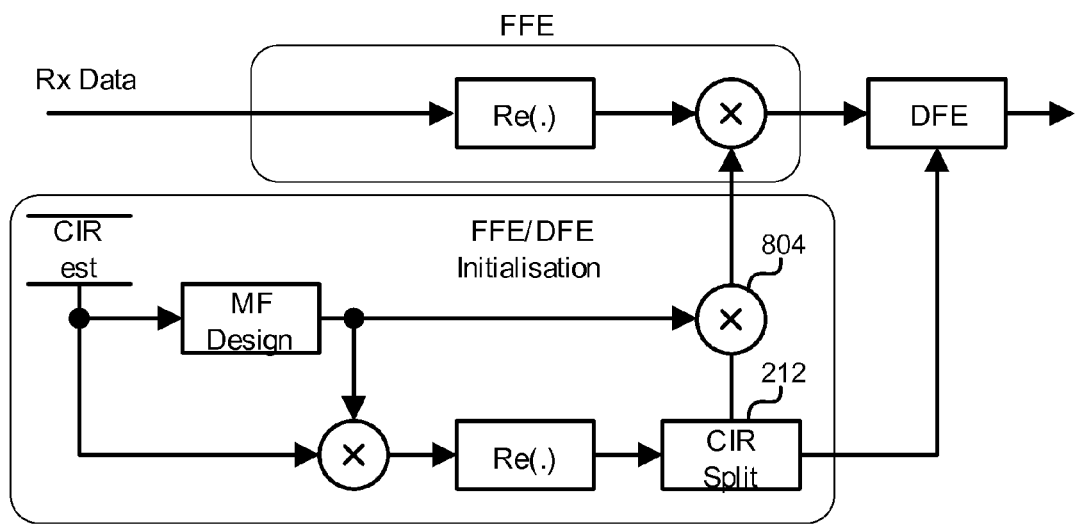
FIG. 9 is a block diagram showing another example method of generating initial equaliser coefficients.

FIG. 8 shows a variation of the example implementation shown in FIG. 6 and described above. In this example, the matched filter 802 (as generated in blocks 104 and 206 and described above) is applied to the output FFE coefficients in the frequency domain 618 from the final subblock 612 (using multiplier 804). By applying the matched filter 802 in this way, it removes the requirement for one of the multipliers shown within the FFE 202 in FIG. 2. Instead, the block diagram of FIG. 2 may be redrawn as shown in FIG. 9. In FIG. 9, the multiplier 804 is shown separate from the CIR split block 212; however, it will be appreciated that the multiplier 804 may alternatively be implemented within the CIR split block 212).

FIG. 8 shows additional, optional, implementation detail where the match filtered FFE coefficients 806 (output from multiplier 804) are combined with the group delay 808 (using multiplier 810). This shifts the FFE coefficients in time such that they are causal (and hence are not generated using future data). Additionally, the FFE tap length may be limited (block 812). In order to limit the FFE tap length, the FFE coefficients 814 (output from multiplier 810) may be converted into the time domain (in block 812) and then the values of some coefficients may be set to zero to limit the number of taps.

Having calculated the initial FFE coefficients 422, 618, 708, 816 these values may be used to calculate the initial DFE coefficients (in block 112) to complete the second stage of the method shown in FIG. 1. The initial DFE coefficients are generated (in block 112) in the frequency domain using the following equation:

$$fDFE = fCIR * fFFE$$

where:
fDFE are the initial DFE coefficients in the frequency domain;
fCIR is the CIR estimate 208; and
fFFE are the initial FFE coefficients in the frequency domain 422, 618, 708, 816 (as generated in block 110).

The inverse FFT is then taken of the fDFE, to convert to the time domain, and then the post echo components are extracted. As the DFE coefficients are in the time domain, extracting the post echo components can be achieved by removing the components which occur at negative and zero time and keeping only the positive time components.

Figure 10:
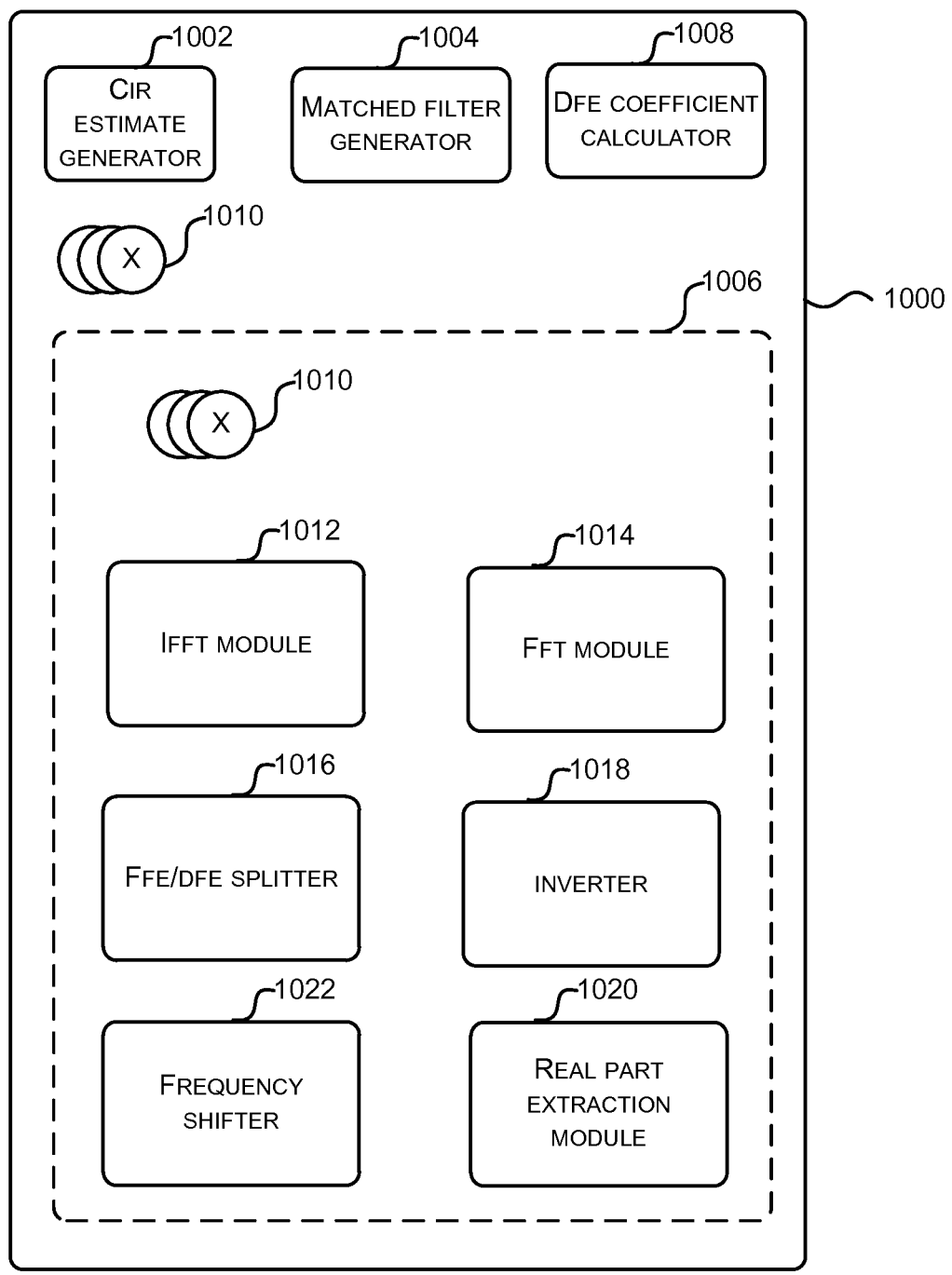
FIG. 10 is a diagram showing hardware logic which may be used to implement the methods described herein.

The functional elements shown in FIGS. 2, 4 and 6-9 and the method blocks shown in FIG. 1 may be implemented using hardware logic and in an example may be implemented in a Digital Signal Processor. As shown in FIG. 10, the FFE/DFE equalisation hardware logic 1000 may comprise a CIR estimate generator 1002 and a matched filter generator 1004. As described above, where iterations are used, the hardware logic 1000 may comprise logic for a single subblock 1006 or for a plurality of subblocks 1006 and signals may be passed through any subblock one or more times. The hardware logic 1000 further comprises a DFE coefficient calculator 1008 and other basic logic elements, such as multipliers 1010. Each subblock 1006 may comprise an IFFT module 1012, an FFT module 1014, an FFE/DFE splitter 1016, an inverter 1018, a real part extraction module 1020 and one or more frequency shifters 1022 as well as other basic logic elements, such as multipliers 1010.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The methods described herein may be used in equalisation of digital terrestrial television signals, for example within a digital television receiver. The methods are, however, also applicable to other applications which use a combination of FFE and DFE (e.g. as shown in FIGS. 2 and 9) and the methods are not limited to use with digital television signals.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of generating initial coefficients for use in an equaliser in a wireless receiver comprising:
   generating a channel matched filter using an estimate of channel impulse response; filtering the estimate of channel impulse response using the channel matched filter;
   splitting the filtered estimate of channel impulse response into a first portion and a second portion, the first portion comprising all pre-echoes; and
   calculating initial Feed-Forward Equaliser (FFE) coefficients using an inverted version of the first portion in a frequency domain.

2. The method according to claim 1, further comprising:
   calculating initial Decision Feedback Equaliser (DFE) coefficients based on the initial FFE coefficients and the estimate of channel impulse response.

3. The method according to claim 1, further comprising:
   applying a window to the estimate of channel impulse response prior to generating the channel matched filter, and
   wherein the windowed estimate of channel impulse response is used to generate the channel matched filter.

4. The method according to claim 3, wherein the window comprises a leading part and a centre part and wherein the leading part has an amplitude which is lower than an amplitude of the centre part.

5. The method according to claim 4, wherein the window further comprises a trailing part and wherein the trailing part has an amplitude which is lower than the amplitude of the centre part.

6. The method according to claim 1, wherein splitting the filtered estimate of channel impulse response into a first portion and a second portion comprises:
   extracting a real part of the filtered estimate of channel impulse response in a frequency domain;
   converting the real part of the filtered estimate of channel impulse response to a time domain; and
   splitting the real part of the filtered estimate of channel impulse response in the time domain into a first portion and a second portion, the first portion comprising all pre-echoes.

7. The method according to claim 1, wherein the first portion of the filtered estimate of channel impulse response comprises all pre-echoes and part of at least one short post-echo.

8. The method according to claim 1, wherein calculating initial FFE coefficients using an inverted version of the first portion in the frequency domain comprises:
   converting the first portion of the filtered estimate of channel impulse response to the frequency domain;
   inverting the first portion of the filtered estimate of channel impulse response in the frequency domain; and
   combining the inverted first portion of the filtered estimate of channel impulse response in the frequency domain with dummy FFE coefficients.

9. The method according to claim 8, further comprising:
   combining the inverted first portion of the filtered estimate of channel impulse response in the frequency domain with the filtered estimate of channel impulse response to generate an updated filtered estimate of channel impulse response; and refining the initial FFE coefficients by:
   extracting a real part of the updated filtered estimate of channel impulse response in the frequency domain;
   converting the real part of the updated filtered estimate of channel impulse response to the time domain;
   splitting the real part of the updated filtered estimate of channel impulse response in the time domain into a first portion and a second portion, the first portion comprising all pre-echoes;
   converting the first portion of the updated filtered estimate of channel impulse response to the frequency domain;
   inverting the first portion of the updated filtered estimate of channel impulse response in the frequency domain; and
   combining the inverted first portion of the updated filtered estimate of channel impulse response in the frequency domain with the initial FFE coefficients to generate refined initial FFE coefficients.

10. The method according to claim 9, further comprising repeating:
    combining the inverted first portion of the updated filtered estimate of channel impulse response in the frequency domain with the updated filtered estimate of channel impulse response to generate a new updated filtered estimate of channel impulse response; and refining the initial FFE coefficients using the new updated filtered estimate of channel impulse response and the refined initial FFE coefficients from a previous iteration.

11. The method according to claim 10, further comprising: calculating initial DFE coefficients based on the refined initial FFE coefficients and the estimate of channel impulse response.

12. The method according to claim 1, further comprising: filtering the initial FFE coefficients using the channel matched filter.

13. An equaliser for use in a wireless receiver, the equaliser comprising hardware logic arranged to generate initial coefficients for the equaliser and the hardware logic comprising:
- a matched filter generator arranged to generate channel matched filter using an estimate of channel impulse response;
- hardware logic arranged to filter the estimate of channel impulse response using the channel matched filter; and
- hardware logic arranged to split the filtered estimate of channel impulse response into a first portion and a second portion, the first portion comprising all pre-echoes, and calculate initial Feed-Forward Equaliser (FFE) coefficients using an inverted version of the first portion in a frequency domain.

14. The equaliser according to claim 13, further comprising:
- a Decision Feedback Equaliser (DFE) coefficient calculator arranged to calculate initial DFE coefficients based on the initial FFE coefficients and the second portion of the filtered estimate of channel impulse response.

15. A digital television receiver comprising an equaliser for use in a wireless receiver, the equaliser comprising hardware logic arranged to generate initial coefficients for the equaliser and the hardware logic comprising:
- a matched filter generator arranged to generate channel matched filter using an estimate of channel impulse response;
- hardware logic arranged to filter the estimate of channel impulse response using the channel matched filter; and
- hardware logic arranged to split the filtered estimate of channel impulse response into a first portion and a second portion, the first portion comprising all pre-echoes, and calculate initial Feed-Forward Equaliser (FFE) coefficients using an inverted version of the first portion in a frequency domain.

16. A non-transitory computer readable storage medium having encoded thereon computer readable program code for generating a processor comprising the equalizer of claim 13.

17. A non-transitory computer readable storage medium having encoded thereon computer readable program code for generating a processor configured to perform the method of claim 1.

18. A non-transitory computer readable storage medium having stored thereon computer executable instructions that when executed cause at least one processor to perform the method of claim 1.

* * * * *